US010776650B2

(12) United States Patent
Geng et al.

(10) Patent No.: US 10,776,650 B2
(45) Date of Patent: Sep. 15, 2020

(54) METHOD AND APPARATUS FOR VIDEO SURVEILLANCE (71) Applicant: BOE TECHNOLOGY GROUP CO., LTD., Beijing (CN)

(72) Inventors: Lihua Geng, Beijing (CN); Junyuan Ren, Beijing (CN); Xiaoyu Li, Beijing (CN); Han Yan, Beijing (CN); Qi Zeng, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 301 days.

(21) Appl. No.: 15/742,321

(22) PCT Filed: May 31, 2017

(86) PCT No.: PCT/CN2017/086543
§ 371 (c)(1),
(2) Date: Jan. 5, 2018

(87) PCT Pub. No.: WO2017/206896
PCT Pub. Date: Dec. 7, 2017

(65) Prior Publication Data
US 2018/0197033 A1    Jul. 12, 2018

(30) Foreign Application Priority Data
Jun. 3, 2016    (CN) .......................... 2016 1 0391410

(51) Int. Cl.
G06K 9/32    (2006.01)
G06K 9/20    (2006.01)
(Continued)

(52) U.S. Cl.
CPC ............ G06K 9/209 (2013.01); G01S 3/7864 (2013.01); G06K 9/3233 (2013.01); G06T 7/70 (2017.01);
(Continued)

(58) Field of Classification Search
CPC .... G06F 3/011; G06F 3/0304; G06F 16/2264; G06F 16/9024; G06F 3/0346;
(Continued)

(56) References Cited

U.S. PATENT DOCUMENTS

2012/0013745 A1    1/2012    Kang et al.

FOREIGN PATENT DOCUMENTS

CN    101335879 A    12/2008
CN    102131047 A    7/2011
(Continued)

OTHER PUBLICATIONS

International search report dated Aug. 29, 2017 for corresponding application No. PCT/CN2017/086543 with English translation attached.
(Continued)

Primary Examiner — Duy M Dang
(74) Attorney, Agent, or Firm — Nath, Goldberg & Meyer; Joshua B. Goldberg (57) ABSTRACT The present application provides a method and apparatus for video surveillance. The method for video surveillance includes: detecting, through an infrared sensor, whether a target is present in a sensing area of the infrared sensor, and generating a deflection instruction indicating a deflection angle in a case where it is detected that the target is present; and deflecting, according to the deflection instruction, a shooting direction of a camera towards the target by the deflection angle.

16 Claims, 6 Drawing Sheets (51) Int. Cl.
    *G01S 3/786*     (2006.01)
    *H04N 7/18*     (2006.01)
    *G06T 7/70*     (2017.01)

(52) U.S. Cl.
    CPC ............... *H04N 7/18* (2013.01); *H04N 7/183* (2013.01); *G06T 2207/10016* (2013.01); *G06T 2207/30232* (2013.01)

(58) Field of Classification Search
    CPC ...... A63F 13/213; A63F 13/24; A63F 13/426; A63F 13/428; A63F 13/655; A63F 13/00; G06T 7/73; G06K 9/00771; G06K 9/6202; G06K 9/00221; G06K 9/00335; G06K 9/00369; G06K 9/627; G06K 9/00718; G06K 9/6256; G06N 3/04; G06N 3/08; H04N 7/181; H04N 5/2226; G08C 17/00; G08C 17/02
    See application file for complete search history.

(56) References Cited

FOREIGN PATENT DOCUMENTS

| | | |
|---|---|---|
| CN | 103051879 A | 4/2013 |
| CN | 202995309 U | 6/2013 |
| CN | 204190875 U | 3/2015 |
| CN | 105828053 A | 8/2016 |

OTHER PUBLICATIONS

Chinese office action dated Apr. 4, 2018 for corresponding CN application No. 201610391410.2 with English translation attached.

METHOD AND APPARATUS FOR VIDEO SURVEILLANCE

CROSS-REFERENCE TO RELATED APPLICATIONS

This is a National Phase Application filed under 35 U.S.C. 371 as a national stage of PCT/CN2017/086543, filed on May 31, 2017, an application claiming the benefit of Chinese Application No. 201610391410.2, filed on Jun. 3, 2016, the content of each of which is hereby incorporated by reference in its entirety.

TECHNICAL FIELD

The present disclosure relates to the field of video surveillance, and particularly to a method and an apparatus for video surveillance.

BACKGROUND

Nowadays, apparatuses for video surveillance have been widely used in various industries. However, in most apparatuses for video surveillance, the camera shooting direction is fixed, that is, only a specific orientation can be under surveillance. These apparatuses for video surveillance are prone to blind areas for surveillance, and may result in missing of important image information. In order to prevent occurrence of blind areas, multiple cameras need to be installed to monitor in multiple directions simultaneously, resulting in increased cost.

SUMMARY

An object of the present disclosure is to provide a method and an apparatus for video surveillance.

In a first aspect, the present disclosure provides a method for video surveillance, including:

detecting, through an infrared sensor, whether a target is present in a sensing area of the infrared sensor, and generating, in a case where it is detected that the target is present in the sensing area of the infrared sensor, a deflection instruction indicating a deflection angle, the infrared sensor being disposed at a first position within a monitored area; and deflecting, according to the deflection instruction, a shooting direction of a camera for video surveillance towards the target by the deflection angle, the camera being disposed at a second position different from the first position and within the monitored area.

Optionally, the infrared sensor includes a plurality of infrared sensors, and the step of detecting whether a target is present in a sensing area of the infrared sensor through the infrared sensor includes: detecting, through each of the plurality of infrared sensors, whether the target is present in the sensing area of the infrared sensor, and generating the deflection instruction according to a combination of respective detection results of the plurality of infrared sensors.

Optionally, the deflection instruction includes a first deflection instruction and a second deflection instruction, and the step of generating the deflection instruction according to a combination of respective detection results of the plurality of infrared sensors includes: in a case where the plurality of infrared sensors sequentially detect that the target is present, generating the first deflection instruction according to a first control strategy; and in a case where at least two infrared sensors of the plurality of infrared sensors simultaneously detect that the target is present, generating the second deflection instruction according to a second control strategy different from a first control strategy.

Optionally, the plurality of infrared sensors are divided into N groups, each of the N groups including at least two infrared sensors, where N is a positive integer. The step of generating the first deflection instruction according to the first control strategy includes: generating one first deflection instruction for an infrared sensor last detecting that the target is present in each of the N groups, wherein the deflection angle indicated by said first deflection instruction is an included angle between a current shooting direction of the camera and a shooting direction of the camera when facing the infrared sensor last detecting that the target is present. The step of deflecting a shooting direction of a camera for video surveillance according to the deflection instruction includes: every time one first deflection instruction is generated, deflecting a shooting direction of the camera towards the target by the deflection angle indicated by said first deflection instruction.

Optionally, the step of generating the second deflection instruction according to the second control strategy includes: selecting one infrared sensor from the at least two infrared sensors which simultaneously detect that the target is present, and generating the second deflection instruction for the selected one infrared sensor, wherein the deflection angle indicated by the second deflection instruction is an included angle between a current shooting direction of the camera and a shooting direction of the camera when facing the selected one infrared sensor.

Optionally, the step of generating the second deflection instruction according to the second control strategy includes: generating the second deflection instruction for the at least two infrared sensors which simultaneously detect that the target is present, wherein the deflection angle indicated by the second deflection instruction is a median of included angles between a current shooting direction of the camera and respective shooting directions of the camera when facing each of the at least two infrared sensors.

Optionally, the infrared sensor is configured to emit an infrared beam, and when the infrared beam is blocked, the infrared sensor detects that the target is present within the sensing area of the infrared sensor.

Optionally, the infrared beam is configured to have a first endpoint and a second endpoint; the first endpoint is set within a mounting area of the camera, and the second endpoint is set to be fixed relative to a mounting position of the camera.

Optionally, the infrared beam is configured to have a first endpoint and a second endpoint; locations of the first endpoint and the second endpoint are set so that a mounting position of the camera is neither in an optical path of the infrared beam and nor in an extension line extending from the optical path.

Optionally, when the infrared beam is blocked, the deflection instruction is generated according to an included angle 'a' between a current shooting direction of the camera and the infrared beam; the step of deflecting a shooting direction of the camera according to the deflection instruction includes: deflecting the current shooting direction towards the infrared beam by an angle of (a+x), where 'x' denotes delay error.

Optionally, a reference angle 'b' relative to an initial shooting direction of the camera is set according to the locations of the first endpoint and the second endpoint.

When the infrared beam is blocked, the deflection instruction is generated according to a current shooting direction of the camera and the reference angle 'b'. The step of deflecting the shooting direction of the camera according to the deflection instruction includes: deflecting the shooting direction of the camera to a direction at an angle of (b+y) relative to the initial shooting direction, where 'y' denotes delay error.

Optionally, the reference angle 'b' is an included angle between a straight connection line, which connects a point of the infrared beam between the first endpoint and the second endpoint with the camera, and the initial shooting direction.

Optionally, in a case where respective infrared beams of at least two infrared sensors of the plurality of infrared sensors are blocked sequentially, a moving speed of the target is determined according to the moments when the respective infrared beams of the at least two infrared sensors are blocked, to thus determine the delay error according to the moving speed.

Optionally, when the infrared sensor detects that the target is present, an on-screen display (OSD) process is performed on a video image shot by the camera.

Optionally, when the infrared sensor detects that the target is present within the sensing area of the infrared sensor, a lighting device disposed in correspondence with the infrared sensor is turned on.

In a second aspect, the present disclosure provides an apparatus for video surveillance, including:

a detection device, which includes at least one infrared sensor, and is configured to detect whether a target is present in a sensing area of the infrared sensor and generate a detection signal indicating whether the target is present, the at least one infrared sensor being disposed at a first position within a monitored area;

a processing device, which is connected with the detection device, and configured to receive the detection signal and generate a deflection instruction indicating a deflection angle according to the detection signal;

a control device, which is connected with the processing device, and configured to receive the deflection instruction and deflect, according to the deflection instruction, a shooting direction of a camera for video surveillance towards the target by the deflection angle; and a camera device, which is connected with the control device, includes the camera, and is configured to shoot a video image through the camera, the camera being disposed at a second position different from the first position and within the monitored area.

Optionally, the detection device includes a plurality of infrared sensors, each of which is configured to detect whether the target is present in the sensing area of the infrared sensor and generate a respective detection signal, and the processing device is configured to generate the deflection instruction according to a combination of respective detection signals received from the plurality of infrared sensors.

Optionally, the deflection instruction includes a first deflection instruction and a second deflection instruction, and the processing device is configured to:

in a case of receiving, sequentially from at least two infrared sensors of the plurality of infrared sensors, detection signals indicating that the target is present, generate the first deflection instruction according to a first control strategy such that one or more first deflection instructions are generated for a part of the at least two infrared sensors from which the detection signals are sequentially received; and in a case of receiving, simultaneously from at least two infrared sensors of the plurality of infrared sensors, detection signals indicating that the target is present, generate the second deflection instruction according to a second control strategy different from the first control strategy, such that one second deflection instruction is generated for the at least two infrared sensors from which the detection signals are simultaneously received.

Optionally, the at least one infrared sensor each includes an infrared beam emitter and an infrared beam receiver such that an infrared beam is formed between the infrared beam emitter and the infrared beam receiver, and in a case where the infrared beam is blocked, the infrared sensor from which the blocked infrared beam is emitted, among the at least one infrared sensor, generates the detection signal indicating that the target is present;

one of the infrared beam emitter and the infrared beam receiver is disposed at a first endpoint, and the other of the infrared beam emitter and the infrared beam receiver is disposed at a second endpoint; and the first endpoint is located within a mounting area of the camera, and the second endpoint is fixed relative to a mounting position of the camera; alternatively, locations of the first endpoint and the second endpoint are set so that the mounting position of the camera is neither in an optical path of the infrared beam nor in an extension line extending from the optical path.

Optionally, the apparatus for video surveillance further includes a lighting device connected to the processing device, and wherein the processing device is further configured to generate a lighting enable signal upon receipt of a detection signal indicating that the target is present from the infrared sensor, and transmit the lighting enable signal to the lighting device to turn on the lighting device.

Optionally, the detection device includes a plurality of infrared sensors, each of which is configured to detect whether the target is present in the sensing area of the infrared sensor and generate a respective detection signal;

the lighting device includes a plurality of illuminators disposed in one-to-one correspondence with the plurality of infrared sensors; and the processing device is configured to, in a case of receiving a detection signal indicating that the target is present from the plurality of infrared sensors, generate a respective lighting enable signal for the infrared sensor generating the detection signal received by the processing device, so as to turn on the illuminator corresponding to the infrared sensor generating the detection signal received by the processing device.

BRIEF DESCRIPTION OF DRAWINGS

The features and advantages of the present disclosure will be better understood with reference to the drawings, which are intended to be illustrative and not to be construed as limiting the present disclosure. In the drawings.

DETAILED DESCRIPTION

To make the above objects, features and advantages of the present disclosure be better understood, the present disclosure will be further described in detail below in conjunction with the accompanying drawings and embodiments. It should be noted that embodiments and features in embodiments of the present disclosure may be combined with each other without conflicting with each other.

In the following description, numerous specific details are set forth to provide a thorough understanding of the present disclosure. However, the present disclosure can also be implemented in other ways different from those described herein. Therefore, the protection scope of the present disclosure is not limited to the embodiments disclosed below.

In conventional apparatuses for video surveillance, even if a monitoring direction is adjustable, it can be adjusted only under manual control, and thus automatic monitoring depending on activities of persons or objects within a monitored place cannot be achieved.

Figure 1:
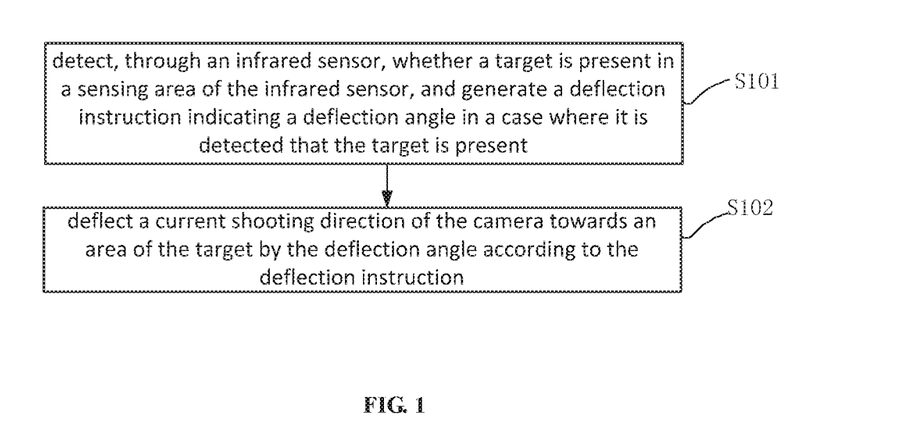
FIG. 1 is a flowchart of a method for video surveillance according to an embodiment of the present disclosure.

In one aspect, there is provided a method for video surveillance. Referring to FIG. 1, the method includes steps S101 and S102.

At step S101, it is detected, through an infrared sensor, whether a target is present in a sensing area of the infrared sensor, and in a case where it is detected that the target is present, a deflection instruction indicating a deflection angle is generated, wherein the infrared sensor is disposed at a first position within a monitored area.

In the video surveillance, a shooting direction of a camera needs to be deflected, so as to avoid the problem of incapability of shooting a specific area due to a fixed shooting direction of the camera, and thus prevent the missing of important image information.

An infrared sensor is typically disposed at significant indoor positions, such as at a doorway, at a window, and near a dead corner. The infrared sensor detects the presence of a target (e.g., a suspect or an object of interest) once the target enters the sensing area of the infrared sensor.

When the target occurs in a sensing area of an infrared sensor, an orientation of the target relative to a current shooting direction of the camera is determined to generate a corresponding deflection instruction, so that the camera is deflected towards the target. The deflection instruction indicates a deflection angle by which the camera is deflected towards the target. The deflection angle may be an included angle between a current shooting direction of the camera and a shooting direction of the camera when facing the infrared sensor. For example, the shooting direction of the camera when facing the infrared sensor may be a shooting direction in which the camera is able to shoot a target that has been sensed by the infrared sensor. In an exemplary embodiment, the deflection instruction is generated by determining the orientation of the target relative to the current shooting direction of the camera.

Specifically, a position of the target relative to the current shooting direction of the camera may be determined through an infrared sensor. For example, the position of the target may be determined through an infrared positioning sensor or a thermal infrared sensor, and the position of the target relative to the current shooting direction of the camera may also be determined when an infrared beam is blocked.

Figure 2:
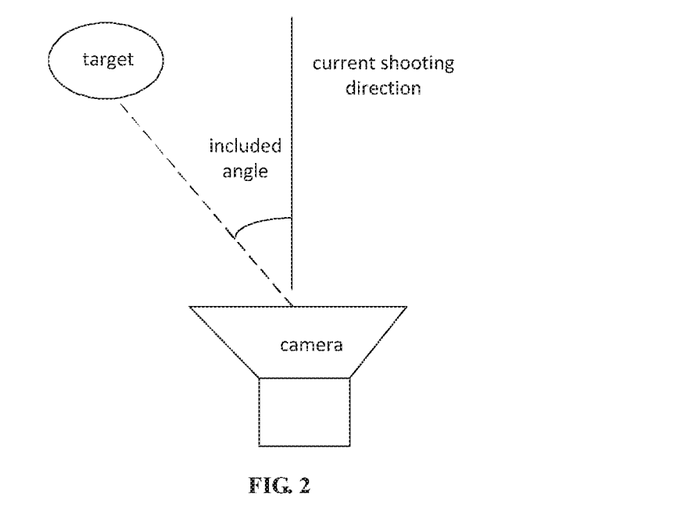
FIG. 2 is a schematic diagram illustrating a location relationship between a target and a camera in a method for video surveillance according to an embodiment of the present disclosure.

Specifically, orientation information of the target relative to the camera is determined by determining the position of the target relative to a current shooting direction of the camera, so that a deflection instruction is generated. As illustrated in FIG. 2, an included angle (which may be decomposed into a horizontal component and a vertical component) between a straight connection line connecting the target with the camera and the current shooting direction of the camera is calculated to generate the deflection instruction indicating a deflection angle corresponding to the included angle between the straight connection line connecting the target with the camera and the current shooting direction of the camera.

Figure 3:
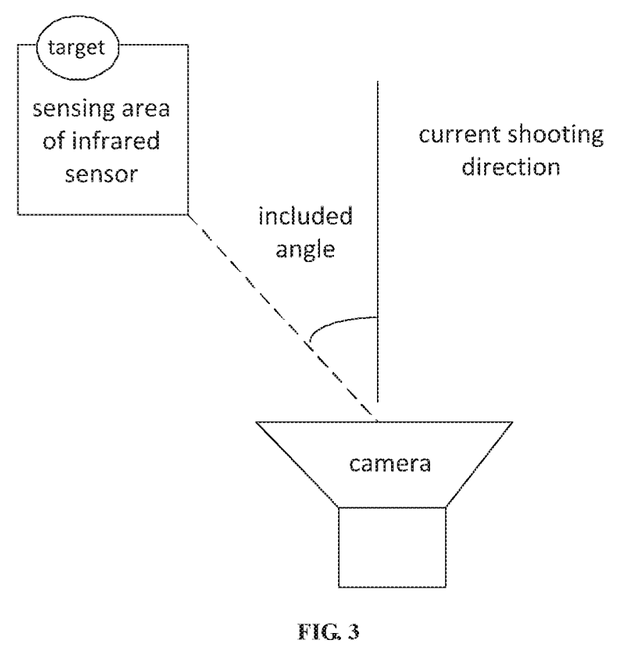
FIG. 3 is a schematic diagram illustrating a location relationship between a target and a sensing area of an infrared sensor in a method for video surveillance according to an embodiment of the present disclosure.

In some embodiments, the deflection instruction is generated by determining an orientation of the sensing area of the infrared sensor relative to the current shooting direction of the camera. As illustrated in FIG. 3, when a target is detected in a sensing area of an infrared sensor, a deflection instruction indicating a deflection angle corresponding to the orientation of the sensing area relative to the current shooting direction of the camera, according to an included angle (which may be decomposed into a horizontal component and a vertical component) between a straight connection line, which connects a point (e.g., the point closest to the camera) within the sensing area of the infrared sensor with the camera, and the current shooting direction of the camera. Preferably, the orientation of the sensing area of the infrared sensor relative to the current shooting direction of the camera may be determined by using a central position of the sensing area of the infrared sensor.

Figure 4:
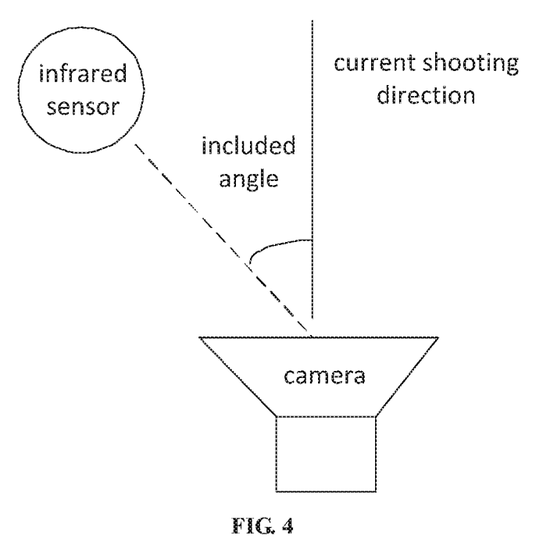
FIG. 4 is a schematic diagram illustrating a location relationship between an infrared sensor and a camera in a method for video surveillance according to an embodiment of the present disclosure.

In some embodiments, the deflection instruction is generated by determining an orientation of the position of the infrared sensor relative to the current shooting direction of the camera. As illustrated in FIG. 4, when a target is detected by an infrared sensor, a deflection instruction indicating a deflection angle corresponding to an included angle between a straight connection line connecting the infrared sensor with the camera and the current shooting direction of the camera, according to the included angle (which may be decomposed into a horizontal component and a vertical component) between the straight connection line connecting the infrared sensor with the camera and the current shooting direction of the camera.

At step S102, a shooting direction of the camera is deflected towards an area of the target by the deflection angle according to the deflection instruction, wherein the camera is disposed at a second position different from the first position and within the monitored area.

By having the infrared sensor and the camera disposed at different positions, detection and tracking of a target can be conducted in larger area, thereby improving performance of video surveillance for the target.

Specifically, the current shooting direction refers to a shooting direction of the camera obtained at the time when it is detected that a target is present in a sensing area of an infrared sensor. The deflection instruction is generated according to the current shooting direction and orientation information of the target relative to the current shooting direction of the camera.

Specifically, the deflection instruction may indicate a deflection amount (e.g., a deflection angle) by which a shooting direction of the camera is deflected towards the target, and may also indicate vertical and horizontal deflection components (e.g., horizontal and vertical components of the deflection angle) of the deflection amount by which the shooting direction of the camera is deflected towards the target. In some embodiments, the deflection instruction includes a vertical pulse-width-modulation (PWM) signal and a horizontal PWM signal. When a stepping motor receives the deflection instruction, it rotates, according to the PWM signal, at a predetermined rotation speed for a predetermined time, to drive the camera to deflect from the current shooting direction towards the target by the deflection amount for shooting.

Specifically, the deflection angle indicated by the deflection instruction may correspond to an exact angle at which the target is relative to the current shooting direction of the camera, may correspond to an included angle between a straight connection line, which connects the infrared sensor that has detected the target with the camera, and the current shooting direction, or may correspond to an included angle between a straight connection line, which connects a point within a sensing area of the infrared sensor with the camera, and the current shooting direction. Therefore, as a result of deflecting the camera towards the target, a shooting direction of the deflected camera may point to the point at which the target is positioned, or may point to an area near the point at which the target is positioned.

It should be noted that one infrared sensor may have multiple parts (e.g., a emitter and a receiver) disposed at respective positions, and the first position includes the respective positions. In this case, the camera may be considered to be disposed at a second position different from the first position as long as one of the parts of the infrared sensor is disposed at a different position from the camera.

By having the above steps S101 and S102 in the embodiments, the shooting direction of the camera is automatically adjusted based on the detection of the target by means of infrared sensing, which implements automatic adjustment of the video surveillance direction, and thus prevents the missing of the important surveillance image information.

In the actual scene, interference may occur in the infrared sensing area, and there may be an error in the amount of deflection for the shooting direction of the camera relative to an area of the target. Optionally, in some embodiments, the infrared sensor senses with an infrared beam, and an included angle is formed between the infrared beam and the current shooting direction. When the infrared beam is blocked, it is detected that the target is present in the sensing area of the infrared sensor.

Specifically, the infrared beam may be an infrared beam generated by a through-beam infrared sensor, or may be an infrared beam generated by a reflective infrared sensor. To improve surveillance effect, a plurality of infrared sensors may be used to generate a plurality of infrared beams, and therefore, once any of the infrared beams is blocked, it is detected that the target enters a sensing area of the infrared sensor that generates the blocked infrared beam. Hereinafter, a case of detection with two infrared beams A, B will be described with reference to an example in FIG. 5.

Figure 5:
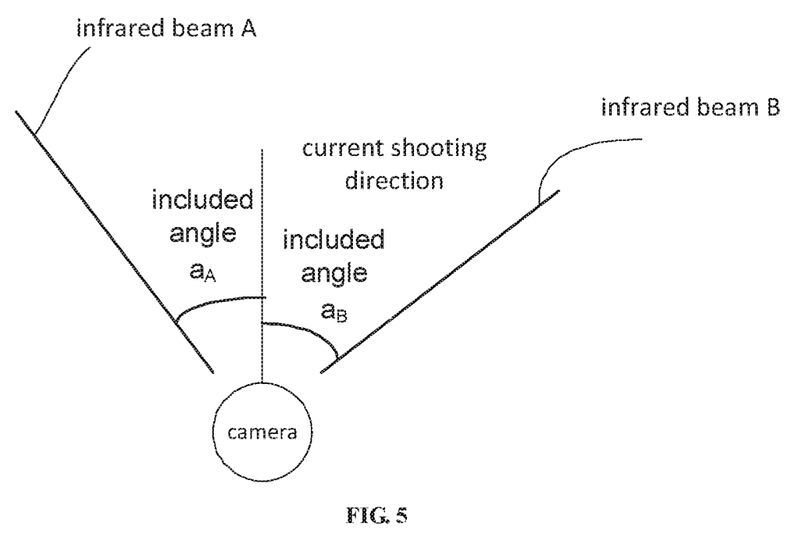
FIG. 5 is a schematic diagram illustrating a location relationship between a plurality of infrared beams and a camera in a method for video surveillance according to an embodiment of the present disclosure.

For example, as illustrated in FIG. 5, once the infrared beam A is blocked, it is detected that the target is present in the optical path of the infrared beam A, and in this case, the camera may be deflected from a current shooting direction towards a direction of the infrared beam A by an angle $a_A$ for the shooting of the target for surveillance. Similarly, once the infrared beam B is blocked, it is detected that the target is present in the optical path of the infrared beam B, and in this case, the camera may be deflected from a current shooting direction towards a direction of the infrared beam B by an angle $a_B$.

By detecting the target with the infrared beam, the included angle between the target and the shooting direction of the camera when the target enters the sensing area of the infrared sensor can be determined accurately, so it is easy to generate the deflection instruction indicating the deflection angle.

In some embodiments, the intersection of the optical path of the infrared beam and the current shooting direction of the camera is not at the camera. In this case, when the included angle between the shooting direction and the infrared beam is $a_C$, the deflection angle by which the camera needs to be deflected is not equal to $a_C$, and needs to be calculated according to geometric principle or preset according to the optical path of the infrared beam C.

In order to set the location of the infrared beam more accurately to improve the surveillance efficiency, in some embodiments, the infrared beam is configured to have a first endpoint and a second endpoint, the first endpoint is set within a mounting area of the camera, and the second endpoint is set to be fixed relative to a mounting position of the camera.

Specifically, the mounting area of the camera refers to a peripheral area of a mounting point of the camera, for example, an area centered on a mounting point of the camera. The mounting area is sufficiently small relative to the space that is captured by the camera, and therefore, in the calculation of the deflection angle, it may be assumed that the first endpoint coincides with the mounting point of the camera, and the error caused thereby is negligible.

Specifically, the camera may be mounted on the top or bottom surface of the room being shot, or may be mounted on a side surface (i.e., a wall) of the room being shot. When the camera is mounted at the center of the top surface of the room being shot, the sum of the deflection angles of the camera relative to the respective side surfaces of the room being shot is the smallest. The camera may also be mounted on a wall opposite to a significant area (such as a door) of the room being shot.

Figure 6:
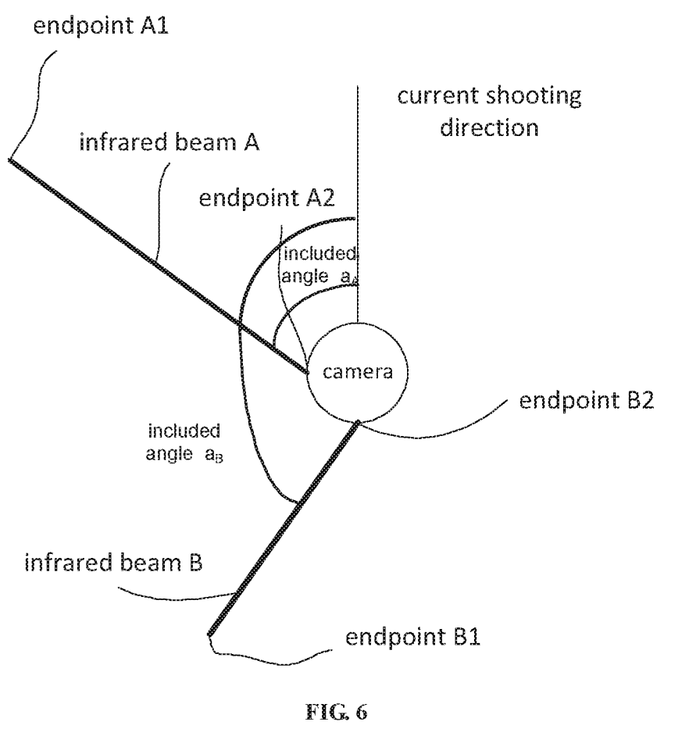
FIG. 6 is a schematic diagram illustrating positions of endpoints of a plurality of infrared beams in a method for video surveillance according to an embodiment of the present disclosure.

For example, by taking two infrared beams as an example and as illustrated in FIG. 6, the infrared beam A is formed between an endpoint A2 and an endpoint A1. The endpoint A2 is located in a mounting area of the camera, and the endpoint A1 is fixed relative to the mounting position of the camera. Similarly, the infrared beam B is formed between an endpoint B2 and an endpoint B1. The endpoint B2 is located in the mounting area of the camera, and the endpoint B1 is fixed relative to the mounting position of the camera.

In some embodiments, the camera and the endpoints of the infrared beam may be disposed separately. For example, the camera may be mounted at the center of the top surface of the room, and the endpoints A1 and B1 are disposed on the wall(s), respectively. The infrared beams A and B may be generated by a reflective infrared sensor, or may be generated by a through-beam infrared sensor.

In some embodiments, when the infrared beam is blocked, the deflection instruction is generated according to an included angle 'a' between a current shooting direction of the camera and the infrared beam, wherein a deflection angle indicated by the deflection instruction corresponds to the included angle 'a'. The step of deflecting a shooting direction of the camera according to the deflection instruction includes: deflecting the current shooting direction of the camera towards the infrared beam by an angle of (a+x), where 'x' denotes delay error.

For example, as illustrated in FIG. 6, it is assumed that an initial shooting direction of the camera is at 0 degree, counterclockwise included angles between the infrared beams A, B and the initial shooting direction of the camera are $a_A$ and $a_B$, respectively, and an infrared beam first blocked is the infrared beam A. When the delay error is not under consideration, the camera needs to be deflected towards the infrared beam A by an angle of $a_A$, and then, if the infrared beam B is blocked, the camera needs to be deflected towards the infrared beam B by an angle of $(a_B-a_A)$. The camera is deflected counterclockwise in a case where the value of $(a_B-a_A)$ is positive, and deflected clockwise in a case where the value of $(a_B-a_A)$ is negative. The initial shooting direction may refer to a shooting direction of the camera subjected to no deflection, e.g., a shooting direction of the camera when powered on.

The deflection instruction may indicate a horizontal component and a vertical component of the deflection angle, respectively. For example, as illustrated in FIG. 6, it is assumed that the initial shooting direction of the camera is at 0 degree in the horizontal and vertical directions, counterclockwise angles between the infrared light beams A, B and the initial shooting direction of the camera in the horizontal direction are $\alpha_A$ and $\alpha_B$, respectively, counterclockwise angles between the infrared beams A, B and the initial shooting direction of the camera in the vertical direction are $\gamma_A$ and $\gamma_B$, respectively, and an infrared beam first blocked is the infrared beam A. When the delay error is not under consideration, the horizontal and vertical angles by which the camera needs to be deflected are $\alpha_A$ and $\gamma_A$, respectively, and then, if the infrared beam B is blocked, the horizontal and vertical angles by which the camera needs to be further deflected are $(\alpha_B-\alpha_A)$ and $(\gamma_B-\gamma_A)$, respectively.

Specifically, there are multiple ways to drive the camera to deflect. For example, the camera may be driven to deflect by a stepping motor. In particular, the number of pulses in a PWM signal used by the stepping motor to drive the camera to rotate may be calculated by the following formula: number of pulses=(α divided by 360)*CYC, or number of pulses=(γdivided by 360)*CYC, where CYC denotes the number of pulses required for the stepping motor to rotate by 360 degrees. The included angles between each infrared beam and the initial shooting direction of the camera in the horizontal and vertical directions need to be input to a phase controller in advance.

Specifically, the current shooting direction is deflected towards the infrared beam by an angle of (a+x), where 'x' denotes delay error. The delay error refers to an increased amount of deflection in consideration of a delay between the moment when the infrared beam is blocked and the moment when the deflection of the camera is completed. For example, in a case of a moving target, the delay error may be determined according to movement information of the target and thus may indicate an amount of deflection corresponding to an amount of movement of the target during a time period from the moment when the infrared beam is blocked to the moment when the deflection of the camera is completed. The quantity 'x' may be a preset compensation value, or may be determined according to a rotation speed of the camera. It should be noted that, the quantity 'x' in this embodiment may have a value of zero, which corresponds to a case of not considering the delay error.

In some embodiments, in addition to disposing the camera and the endpoints of the infrared beam separately, the endpoint(s) of the infrared beam may also be integrated in a camera device, that is, the emitter or the receiver for the infrared beam may be provided in a camera device including the camera.

Figure 7:
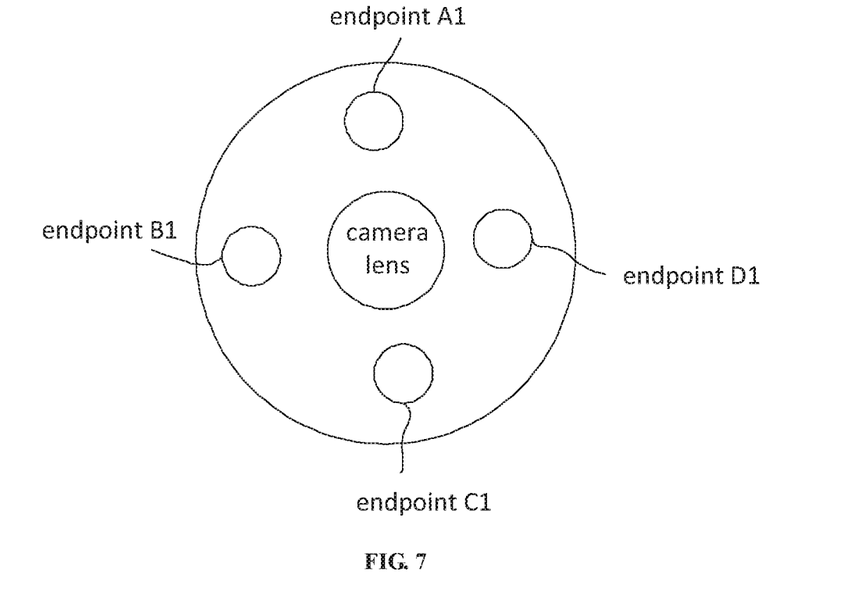
FIG. 7 is a schematic diagram illustrating positions of endpoints of a plurality of infrared beams in a method for video surveillance according to an embodiment of the present disclosure.

Description will be given with reference to FIG. 7 by way of example. It is assumed that there are four infrared beams A, B, C and D (not illustrated in FIG. 7), which are configured to have endpoints A1, A2, B1, B2, C1, C2, D1 and D2, respectively; the infrared beams A, B, C and D are emitted from the endpoints A1, B1, C1, and D1 into the shooting space, respectively, and respective included angles between the infrared beams A, B, C and D and the initial shooting direction of the camera are fixed; and the endpoints A2, B2, C2 and D2 (not illustrated in FIG. 7) are disposed in the mounting area of the camera such that the camera is located in the optical path (or an extension line extending from the optical path) of the infrared beams A, B, C and D.

Specifically, because respective included angles $a_A$, $a_B$, $a_C$ and $a_D$ between the infrared beams A, B, C and D and the initial shooting direction of the camera are fixed, the deflection angle of the camera needs no additional calculation. For example, when the infrared beam A is blocked, the camera is deflected towards the infrared beam A by an angle of $a_A$, and then, when the infrared beam B is blocked, the camera is further deflected towards the infrared beam B by an angle of $(a_B-a_A)$. In such an approach of integrating one of a pair of endpoints of an infrared beam in the camera, an included angle between the infrared beam and the initial shooting direction may be determined by using a preset direction in which the infrared beam is emitted, so as to determine the deflection angle. In this case, there is no need to calculate an included angle between the infrared beam and the current shooting direction during the deflecting of the camera, thereby saving the amount of calculation and improving the accuracy.

It should be noted that, in the approach of integrating the endpoint of the infrared beam in the camera, the delay error 'x' may also be added in the deflection angle, which is not repeatedly described herein.

In order to set the infrared beam more flexibly, in some embodiments, the infrared beam is configured to have a first endpoint and a second endpoint, and the locations of the first and second endpoints may be preset so that a mounting position of the camera is neither in an optical path of the infrared beam nor in an extension line extending from the optical path.

Figure 8:
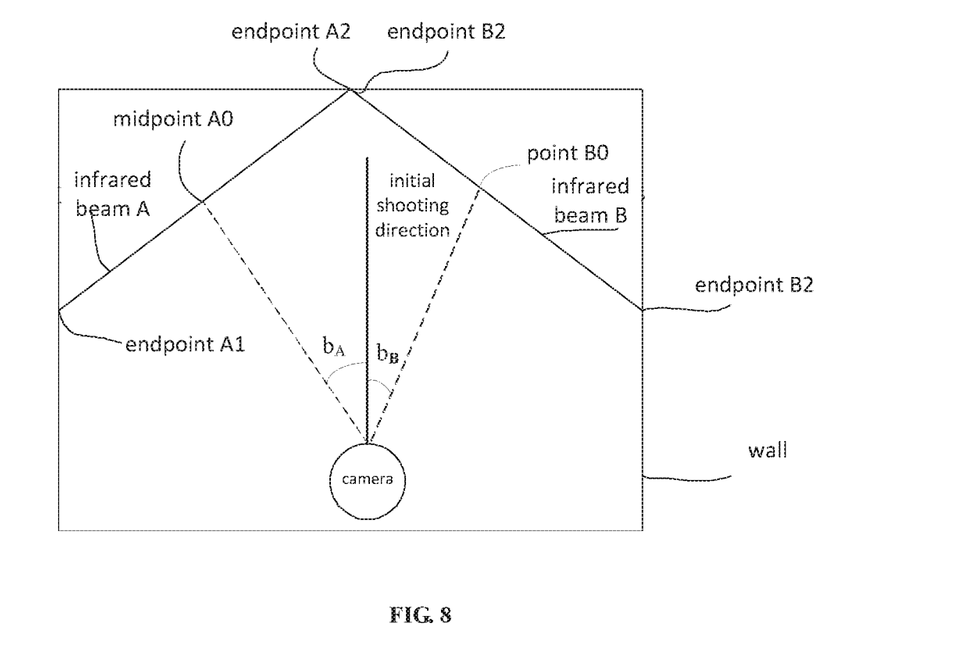
FIG. 8 is a schematic diagram illustrating positions of endpoints of a plurality of infrared beams in a method for video surveillance according to an embodiment of the present disclosure.

For example, an example of two infrared beams is illustrated with reference to FIG. 8. The infrared beam A is formed between an endpoint A2 and an endpoint A1, and the infrared beam B is formed between an endpoint B2 and an endpoint B1. The locations of the endpoints A1, A2, B1, and B2 are respectively set so that the mounting position of the camera is neither in an optical path of the infrared beam nor in an extension line extending from the optical path (that is, the infrared beam does not pass through the camera). For example, the endpoints A1 and A2, B1 and B2 may be disposed on two vertical walls. When the infrared beam A is blocked, the shooting direction of the camera is deflected toward the direction of the infrared beam A.

The reference angle 'b' relative to an initial shooting direction of the camera may be set according to the locations of the first and second endpoints. In some embodiments and with reference to FIG. 8, the reference angle 'b' may be a deflection angle $b_A$ by which a shooting direction of the camera needs to be deflected when the infrared beam A is blocked, and a deflection angle $b_B$ by which a shooting direction of the camera needs to be deflected when the infrared beam B is blocked. The reference angle 'b' (including $b_A$ and $b_B$) may be preset in various ways. For example, with reference to FIG. 8, the initial shooting direction of the camera may be set as 0°, and for the infrared beam A, an included angle between a straight connection line, which connects a point A0 (for example, the midpoint) on the line segment between the endpoints A1 and A2 with the camera, and the initial shooting direction of the camera may be set as the reference angle $b_A$, by which the shooting direction of the camera needs to be deflected when the infrared beam A is blocked. Similarly, for the infrared beam B, an included angle between a straight connection line, which connects a point B0 (for example, the midpoint) on the line segment between the endpoints B1 and B2 with the camera, and the initial shooting direction of the camera may be set as the reference angle $b_B$.

When the infrared beam A is blocked, the deflection instruction is generated according to the current shooting direction and the reference angle $b_A$, the camera is deflected from a current shooting direction by an angle of $(b_A+y)$, where 'y' denotes delay error. Subsequently, when the infrared beam B is blocked, the camera is further deflected from a current shooting direction by an angle of $(b_B-b_A)+y$ such that the shooting direction is deflected to a direction of the infrared beam B. The delay error 'y' is similar to the above delay error 'x' and will not be described herein.

In some embodiments, the infrared sensor includes a plurality of infrared sensors, and the step of detecting whether a target is present in a sensing area of the infrared sensor through the infrared sensor includes: detecting, through each of the plurality of infrared sensors, whether the target is present in the sensing area of the infrared sensor, and generating the deflection instruction according to a combination of respective detection results of the plurality of infrared sensors.

Figure 9:
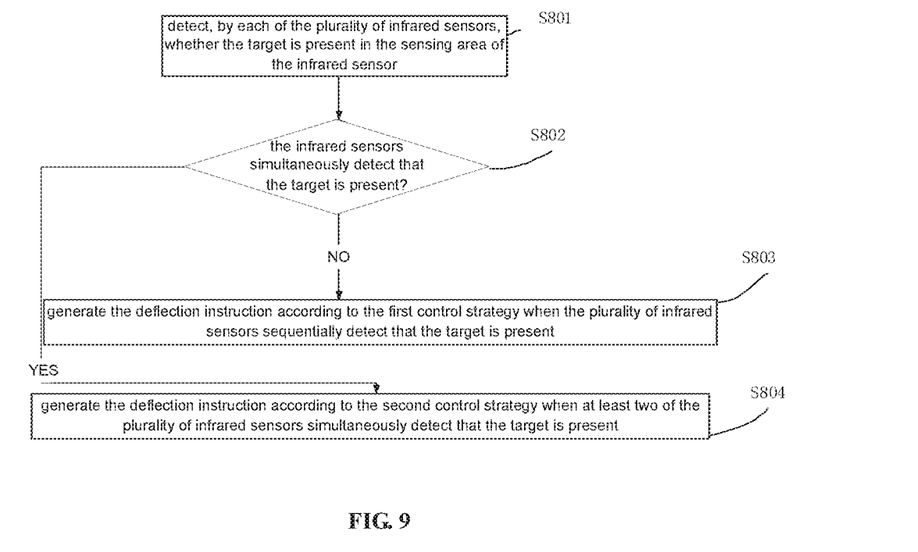
FIG. 9 is a flowchart of a method for video surveillance according to another embodiment of the present disclosure.

For example, each of the plurality of infrared sensors detects whether the target is present in the sensing area of the infrared sensor (e.g., step S801 in FIG. 9). The infrared sensor generates a detection signal indicating a detection result. In one example, the infrared sensor detecting the presence of the target generates a detection signal with high level, and the infrared sensor not detecting the presence of the target generates a detection signal with low level. However, the detection signal of the infrared sensor is not limited thereto.

In some embodiments, the deflection instruction includes a first deflection instruction and a second deflection instruction, and the step of generating the deflection instruction according to a combination of respective detection results of the plurality of infrared sensors includes: in a case where at least two of the plurality of infrared sensors sequentially detects that the target is present, generating the first deflection instruction according to a first control strategy (e.g., step S803 in FIG. 9); and in a case where at least two infrared sensors of the plurality of infrared sensors simultaneously detect that the target is present, generating the second deflection instruction according to a second control strategy (e.g., step S804 in FIG. 9). The term "control strategy" refers to a pre-stored processing rule or a processing rule generated according to the way the infrared beam is blocked.

It should be noted that, the first deflection instruction and the second deflection instruction differ only in terminology to correspond to the first control strategy and the second control strategy, are identical in terms of instruction format, encoding method, etc. and are both used to indicate a deflection angle for an object (for example, an infrared sensor).

In one example, whether at least two of the plurality of infrared sensors sequentially detect the presence of the target may be determined by monitoring in real-time a plurality of detection signals generated by the plurality of infrared sensors, and when at least two of the plurality of detection signals sequentially turn into high level, determining that at least two of the plurality of infrared sensors sequentially detect the presence of the target.

In one example, whether at least two of the plurality of infrared sensors simultaneously detect the presence of the target may be determined by monitoring in real-time a plurality of detection signals generated by the plurality of infrared sensors, and when at least two of the plurality of detection signals simultaneously turn into high level, determining that at least two of the plurality of infrared sensors simultaneously detect the presence of the target.

Specifically, the step of generating the first deflection instruction according to the first control strategy may include: generating the deflection instructions sequentially according to a time sequence in which the plurality of infrared sensors sequentially detect the presence of the target, so that the shooting direction of the camera is sequentially deflected towards the directions of the infrared sensors detecting the presence of the target. For example, for each infrared sensor, once it detects the presence of the target, a deflection instruction for the infrared sensor, indicating a deflection angle from a current shooting direction to a shooting direction of the camera when facing the infrared sensor, is generated.

Here, a shooting direction of the camera when facing an infrared sensor includes a shooting direction pointing to the infrared sensor and a shooting direction pointing to a point within a sensing area of the infrared sensor.

In some embodiments, considering that a case where multiple infrared sensors sequentially detect the presence of the target is usually a case where a displacement of the target occurs, the plurality of infrared sensors may be divided into N (N being a positive integer) groups each including at least two infrared sensors, and the step of generating the first deflection instruction according to the first control strategy may include: generating one first deflection instruction for an infrared sensor last detecting the presence of the target in each group, wherein the first deflection instruction indicates a deflection angle from a current shooting direction to a shooting direction of the camera when facing the infrared sensor last detecting the presence of the target. In this case, the step of deflecting a shooting direction of the camera according to the deflection instruction may include: every time one first deflection instruction is generated for a group of infrared sensors, deflecting a shooting direction of the camera towards the target by the deflection angle indicated by the first deflection instruction.

Figure 10:
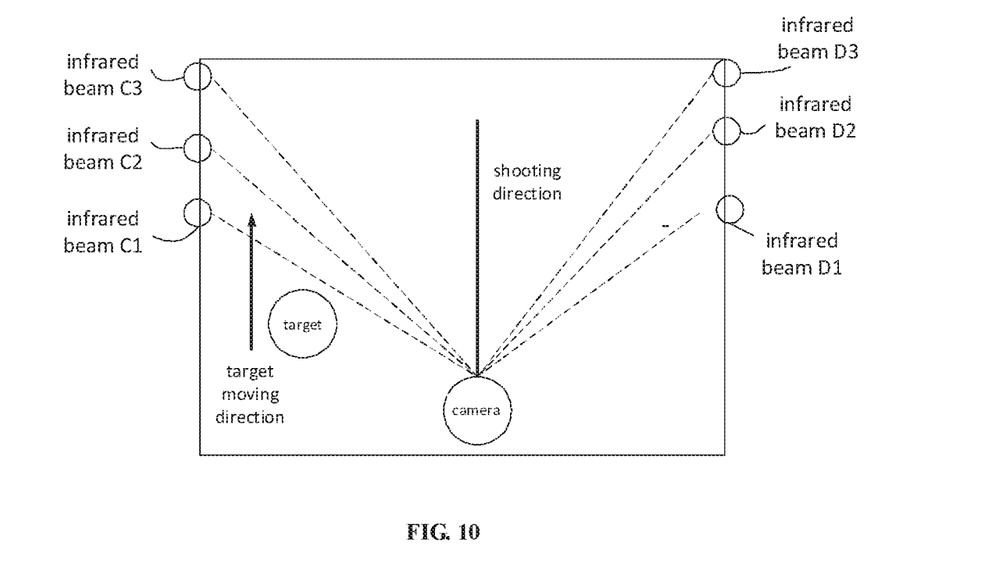
FIG. 10 is a schematic diagram illustrating a case where a plurality of infrared beams are blocked in a method for video surveillance according to an embodiment of the present disclosure.

For example, a case where the plurality of infrared sensors are divided into two groups (i.e., N=2) and each infrared sensor detects the target through infrared beam is illustrated as an example. As illustrated in FIG. 10, infrared beams corresponding to the plurality of infrared sensors are divided into two groups, one of which includes infrared beams C1, C2 and C3, and the other of which includes infrared beams D1, D2 and D3. A moving direction of the target is a direction from the infrared beam C1 to the infrared beam C3, and when the infrared beams C1, C2 and C3 are blocked sequentially, the infrared beam C3 is the last one that is blocked. Thus, the deflection instruction is generated according to an included angle between the infrared beam C3 and a current shooting direction, and the deflection angle corresponds to the included angle between the infrared beam C3 and the current shooting direction. Further, in some embodiments, the presence of the target may be detected sequentially by more than one group of infrared sensors. In one example, a deflection instruction may be generated for an infrared beam last detecting the presence of the target in each time period, so that only one deflection instruction is generated in one time period. A case of infrared beams E1, E2, E3, E4, E5, and E6 of six infrared sensors is illustrated as an example. For example, in a first period, the infrared beams E1 and E2 are sequentially blocked, and when the first period ends, a deflection instruction is generated according to the infrared beam E2; in a second period, the infrared beams E3, E4, and E5 are sequentially blocked, and when the second period ends, a deflection instruction is generated according to the infrared beam E5; in a third period, the infrared beam E6 is blocked, and when the third period ends, a deflection instruction is generated according to the infrared beam E6. Every time a deflection instruction is generated, a shooting direction of the camera is deflected towards the target by a deflection angle indicated by the deflection instruction.

In some embodiments, the method may further include determining a moving speed of the target according to the moments when infrared sensors in each group of infrared sensors detect the presence of the target, to thus determine the delay error. As illustrated in FIG. 10, the angular velocity of the target moving relatively to the camera is determined according to the moments when the respective infrared beams C1, C2 and C3 are blocked, and delay error is determined in consideration of the time it takes for the camera to deflect, and thus the deflection instruction is generated. The delay error may correspond to an amount of movement of the target during a time period from the time when an infrared beam is blocked to the time when the camera is deflected to the infrared beam, for example, a product of the time period and the angular velocity of the target.

Specifically, the step of generating the second deflection instruction according to the second control strategy may include: selecting one infrared sensor from the at least two infrared sensors simultaneously detecting the presence of the target, and generating one second deflection instruction for the selected one infrared sensor, wherein the second deflection instruction indicates a deflection angle from a current shooting direction to a shooting direction of the camera when facing the selected one infrared sensor.

In some embodiments, the step of generating the second deflection instruction according to the second control strategy may include: generating the second deflection instruction for the at least two infrared sensors, wherein the second deflection instruction indicates, as the deflection angle, a median of deflection angles from a current shooting direction to respective shooting directions of the camera when facing each of the at least two infrared sensors. For example, in a case where an infrared sensor detects the presence of the target through an infrared beam, one second deflection instruction is generated according to a median of included angles, or reference angles, between a current shooting direction and multiple infrared beams that are simultaneously blocked.

In specific implementation, one infrared sensor may be selected arbitrarily from the at least two infrared sensors simultaneously detecting the presence of the target; or, an infrared sensor near an important area (such as a door) of the monitored room may be selected, so that the camera for surveillance captures the most significant image information.

It should be noted that, it is possible to periodically monitor whether multiple infrared sensors detect the presence of the target. For example, in a case where the infrared sensor performs detection by way of infrared beam, whether the infrared beams are blocked is detected periodically and sequentially, and only one infrared beam is detected in one period, so that only one second deflection instruction is generated in one period. As illustrated in FIG. 10, an infrared beam C1 may be detected in period T1, an infrared beam C2 may be detected in period T2, so on and so forth, and an infrared beam D3 may be detected in period T6, and infrared beams C1, C2, . . . , D3 are detected cyclically. In this way, the deflection instruction is generated according to only one blocked infrared beam in one period.

A case where one deflection instruction is generated according to a median of included angles or reference angles between a current shooting direction and multiple infrared beams that are simultaneously blocked is illustrated with reference to FIG. 10. When it is determined that the infrared beams C1, C2 and C3 are blocked simultaneously, it indicates that multiple targets are simultaneously present in respective directions of the infrared beams C1, C2 and C3. In order to monitor the maximum number of targets among the multiple targets, the deflection instruction may be generated according to a median of included angles or reference angles between the infrared beams C1, C2, C3 and a current shooting direction of the camera, and the generated deflection instruction may instruct the camera to deflect by the median of the deflection angles for the infrared beams C1, C2 and C3. It should be noted that the deflection instruction may also instruct the camera to deflect by a deflection angle for the infrared beam (e.g., the infrared beam C2 in the figure), which is nearest to a direction that is at an angle of the median relative to the current shooting direction.

Further, in some embodiments, the method further includes: performing an OSD process on a video image shot by the camera when the infrared sensor detects that the target is present. That is, an OSD process is performed on the video data inputted from the camera by a video recording device; for example, information such as infrared sensor number information, infrared sensor orientation information, target appearance time, or the like is added, and the processed video data is encoded and stored.

Figure 11:
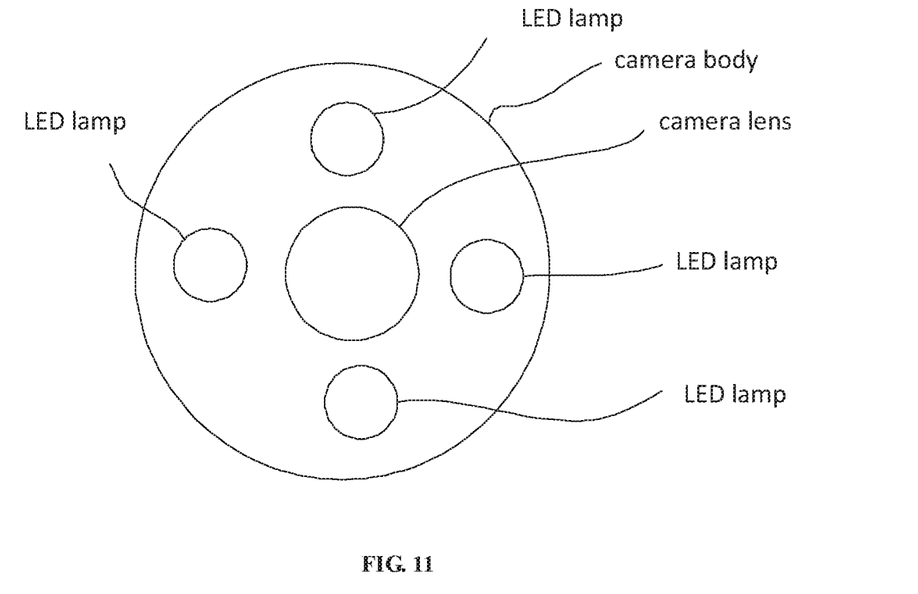
FIG. 11 is a schematic diagram illustrating a position of a lighting device according to an embodiment of the present disclosure.

Further, in some embodiments, the method further includes: turning on a lighting device provided in correspondence with an infrared sensor when the infrared sensor detects the presence of the target. The lighting device may be integrally disposed near the camera; for example, as illustrated in FIG. 11, the camera includes a camera lens and a camera body, and the lighting device such as a plurality of light-emitting-diode (LED) lamps may be integrated into the camera body together with the camera lens. The lighting device may also be a separate lighting device (such as an LED lamp, a fluorescent lamp) in the room monitored by the camera, and the control module of the lighting device enables lighting upon receipt of a trigger signal sent by the apparatus for video surveillance. In some embodiments, the lighting device disposed in correspondence to an infrared sensor may be a lighting device disposed near the infrared sensor, or may be a lighting device capable of irradiating the sensing region of the infrared sensor (for example, a lighting device integrally disposed with the camera and having a light emitting direction identical to the shooting direction of the camera).

Figure 12:
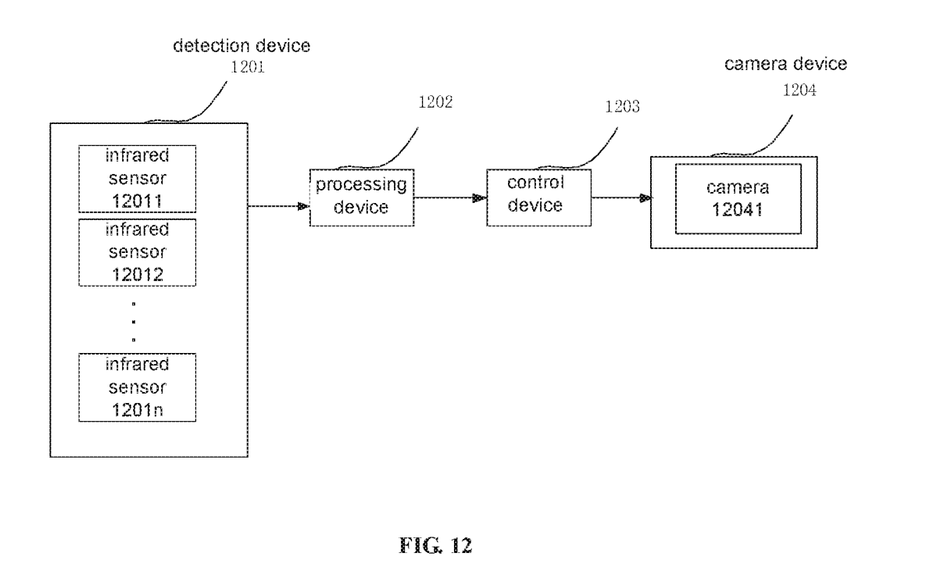
FIG. 12 is a schematic block diagram of an apparatus for video surveillance according to an embodiment of the present disclosure.

In another aspect, there is further provided an apparatus for video surveillance, which includes a detection device 1201, a processing device 1202, a control device 1203, and a camera device 1204.

The detection device 1201 includes at least one infrared sensor, and is configured to detect whether a target is present in a sensing area of the infrared sensor and generate a detection signal indicating whether the target is present.

The processing device 1202 is connected with the at least one infrared sensor, and configured to receive the detection signal and generate a deflection instruction indicating a deflection angle according to the detection signal.

The control device 1203 is connected with the processing device, and configured to receive the deflection instruction and deflect, according to the deflection instruction, a shooting direction of a camera for video surveillance towards the target by the deflection angle.

The camera device 1204 is connected to the control device, and configured to shoot a video image through the camera 12041

Further optionally, the detection device 1201 may include a plurality of infrared sensors such as an infrared sensor 12011, an infrared sensor 12012, . . . , and an infrared sensor 1201n, and each infrared sensor may detect a target and generate a respective detection signal.

In some embodiments, each infrared sensor may include an infrared beam emitter and an infrared beam receiver such that an infrared beam is formed between the infrared beam emitter and the infrared beam receiver, and in a case where the infrared beam is blocked, the infrared sensor from which the blocked infrared beam is emitted, among the at least one infrared sensor, generates the detection signal indicating that the target is present.

One of the infrared beam emitter and the infrared beam receiver is disposed at a first endpoint, and the other of the infrared beam emitter and the infrared beam receiver is disposed at a second endpoint.

The first endpoint is set within a mounting area of the camera 12041, and the second endpoint is set to be fixed relative to a mounting position of the camera 12041. Alternatively, positions of the first endpoint and the second endpoint are set so that the mounting position of the camera is neither in an optical path of the infrared beam nor in an extension line extending from the optical path.

Further optionally, the apparatus for video surveillance further includes a lighting device connected to the processing device 1202, and the processing device 1202 is further configured to generate a lighting enable signal when the infrared sensor detects that the target is present, and transmit the lighting enable signal to the lighting device to turn on the lighting device.

In some embodiments, the lighting device includes a plurality of illuminators in one-to-one correspondence with the plurality of infrared sensors 12011-1021n. Upon receipt of the detection signal, the processing device 1202 generates a lighting enable signal for the infrared sensor generating the detection signal received by the processing device so as to turn on the illuminator corresponding to the infrared sensor generating the detection signal received by the processing device. For an example of the illuminator, FIG. 11 and description thereof can be referred to.

Further, the processing device may be configured to generate the deflection instruction according to an included angle 'a' between the current shooting direction of the camera and the infrared beam, when the infrared sensor detects that the target is present. The control device may be configured to deflect the current shooting direction of the camera towards the infrared beam by an angle of (a+x), where 'x' denotes delay error.

Further, the processing device is further configured to set a reference angle 'b' relative to a shooting direction according to locations of the first endpoint and the second endpoint, and generate the deflection instruction according to the current shooting direction and the reference angle 'b'. The control device is configured to deflect the current shooting direction of the camera by an angle of (b+y), where 'y' denotes delay error.

Further, the processing device may be configured to generate the deflection instruction according to a combination of detection signals received from the plurality of infrared sensors. Specifically, the processing device is configured to generate the deflection instruction according to a first control strategy, in a case where detection signals indicating the presence of the target are received sequentially from at least two of the plurality of infrared sensors, and to generate the deflection instruction according to a second control strategy, in a case where detection signals indicating the presence of the target are received simultaneously from at least two of the plurality of infrared sensors.

Further, the generation of the deflection instruction by the processing device according to the first control strategy may include: generating the deflection instructions sequentially according to a time sequence in which the plurality of infrared sensors sequentially detect the presence of the target, so that the shooting direction of the camera is sequentially deflected towards the directions of the infrared sensors detecting the presence of the target; alternatively, the plurality of infrared sensors are divided into N groups, each of the N groups including at least two infrared sensors, where N is a positive integer, and one first deflection instruction is generated for an infrared sensor last detecting that the target is present in each of the N groups. The processing device may also determine a moving speed of the target according to the times when infrared sensors in each of the N groups detect the presence of the target, respectively, and thus determine delay error.

Further, the generation of the deflection instruction by the processing device according to the second control strategy may include: selecting one infrared sensor from the at least two infrared sensors simultaneously detecting the presence of the target, and generating one deflection instruction for the selected one infrared sensor, wherein the deflection instruction indicates a deflection angle from a current shooting direction to a shooting direction of the camera when facing the selected one infrared sensor; alternatively, generating the deflection instruction for the at least two infrared sensor, wherein the deflection instruction indicates, as the deflection angle, a median of deflection angles from a current shooting direction to respective shooting directions of the camera when facing each of the at least two infrared sensors.

It should be noted that, the processing device may also periodically monitor whether multiple infrared sensors detect the presence of the target. For example, in a case where the infrared sensor performs detection by way of infrared beam, whether the infrared beams are blocked is detected periodically and sequentially, so that only one deflection instruction is generated in one period.

Further, the processing device is further configured to perform an OSD process on a video image shot by the camera device when the infrared sensor detects that the target is present.

In the method and apparatus for video surveillance provided by the present disclosure, a deflection instruction is generated upon detection that a target is present in a sensing area of an infrared sensor, and a current shooting direction of the camera for video surveillance is deflected towards an area of the target according to the deflection instruction. By doing so, differing from conventional image tracking method, the method and apparatus according to the present disclosure automatically deflect the shooting direction of the camera based on the detection result of the infrared sensor, which saves the calculation amount in target tracking and reduces the cost of the apparatus for video surveillance.

Since the apparatus for video surveillance according to the embodiments of the present disclosure is an apparatus for implementing the method for video surveillance provided by the embodiments of the present disclosure, those skilled in the art can understand specific implementations and various variations thereof for the apparatus for video surveillance according to the embodiments of the present disclosure, based on the method for video surveillance according to the embodiments of the present disclosure. Therefore, details about how to implement the method for video surveillance in the present disclosure by the apparatus for video surveillance will not be described in detail herein. Any apparatus that is used by those skilled in the art to implement the method for video surveillance in the present disclosure shall fall within the protection scope of the present application.

The algorithms and displays provided herein are not inherently related to any particular computer, virtual apparatus, or other apparatus. Various general purpose apparatuses can also be used with teaching set forth herein. From the above description, the structure required to construct such an apparatus is evidently clear. In addition, the present disclosure is not directed to any particular programming language. It should be understood that the description of the present application herein may be embodied in various programming languages and the above description of a particular language is to disclose best mode of the present application.

Numerous specific details are set forth in the description provided herein. However, it should be understood that the embodiments of the present disclosure may be practiced without these specific details. In some examples, well-known methods, structures, and techniques are not shown in detail in order not to obscure the understanding of this specification.

Similarly, it should be understood that in the foregoing description of exemplary embodiments of the present disclosure, various features of the present application are sometimes grouped together into a single embodiment, a single figure, or description thereof, to simplify the present disclosure and assist in understanding one or more of various aspects of the present disclosure. However, the disclosed method should not be construed as reflecting the intention that the claimed application requires more features than those explicitly recited in each claim. Rather, as reflected by the following claims, aspects of the present disclosure lie in less than all features of a single embodiment disclosed above. Thus, the claims following the Detailed Description are hereby expressly incorporated into the Detailed Description, with each claim standing on its own as a separate embodiment of the present disclosure.

Those skilled in the art can understand that the modules in the devices in the embodiments may be adaptively changed and disposed in one or more devices different from those of the embodiments. Modules or units or components in the embodiments may be combined into one module or unit or component, and in addition, they may be divided into multiple sub-modules or sub-units or sub-components. All of the features disclosed in this specification (including the accompanying claims, abstract and drawings), processes of the method or units of the apparatus disclosed herein may be combined in any combination, unless at least some of such features and/or processes or units are mutually exclusive. Unless otherwise explicitly stated, each feature disclosed in this specification (including the accompanying claims, abstract and drawings) may be replaced with alternative features serving the same, equivalent or similar purpose.

In addition, those skilled in the art will appreciate that, although some embodiments herein include some but not other features included in other embodiments, combinations of features of different embodiments are meant to be within the scope of the present disclosure and to form different embodiments. For example, in the following claims, any one of the claimed embodiments may be used in any combination.

The various component embodiments of the present disclosure may be implemented in hardware or in software modules running on one or more processors or in a combination thereof. Those skilled in the art should understand that a microprocessor or a digital signal processor (DSP) may be used in practice to implement some or all of the functions of some or all of the components of the gateway, proxy server and apparatus according to the embodiments of the present disclosure. The present disclosure may also be implemented as a device or apparatus program (e.g., a computer program and a computer program product) for performing part or all of the methods described herein. Such a program implementing the present application may be stored on a computer readable medium or may have the form of one or more signals. Such signals may be downloaded from Internet websites, provided on carrier signals, or provided in any other form.

It should be noted that the above-mentioned embodiments illustrate rather than limit the present disclosure, and that those skilled in the art may devise alternative embodiments without departing from the scope of the appended claims. In the claims, any reference signs placed between parentheses shall not be construed as limiting the claim. The word "comprise" does not exclude the presence of element(s) or step(s) not listed in the claim. The word "a" or "an" preceding an element does not exclude the presence of a plurality of such elements. The present disclosure can be implemented by way of hardware including several different elements and an appropriately programmed computer. In the unit claims enumerating several means, several of these means can be embodied by one and the same item of hardware. The use of the words "first", "second", "third", and the like does not denote any order. These words can be interpreted as names.

What is claimed is:

1. An apparatus for video surveillance, comprising:
a detection device, which comprises at least one infrared sensor, and is configured to detect whether a target is present in a sensing area of the infrared sensor and generate a detection signal indicating whether the target is present, the at least one infrared sensor being disposed at a first position within a monitored area;
a processing device, which is connected with the detection device, and configured to receive the detection signal and generate a deflection instruction indicating a deflection angle according to the detection signal;
a control device, which is connected with the processing device, and configured to receive the deflection instruction and deflect, according to the deflection instruction, a shooting direction of a camera for video surveillance towards the target by the deflection angle; and
a camera device, which is connected with the control device, includes the camera, and is configured to shoot a video image through the camera, the camera being disposed at a second position different from the first position and within the monitored area,
wherein the detection device comprises a plurality of infrared sensors, each of the infrared sensors is configured to detect whether the target is present in the sensing area of the infrared sensor and generate a respective detection signal, and the processing device is configured to generate the deflection instruction according to a combination of respective detection signals received from the plurality of infrared sensors, and
wherein the deflection instruction comprises a first deflection instruction and a second deflection instruction, and the processing device is configured to:
in a case of receiving, sequentially from at least two infrared sensors of the plurality of infrared sensors, detection signals indicating that the target is present, generate the first deflection instruction according to a first control strategy such that one or more first deflection instructions are generated for a part of the at least two infrared sensors from which the detection signals are sequentially received; and
in a case of receiving, simultaneously from at least two infrared sensors of the plurality of infrared sensors, detection signals indicating that the target is present, generate the second deflection instruction according to a second control strategy different from the first control strategy, such that one second deflection instruction is generated for the at least two infrared sensors from which the detection signals are simultaneously received.

2. The apparatus for video surveillance of claim 1, wherein
the at least one infrared sensor each includes an infrared beam emitter and an infrared beam receiver such that an infrared beam is formed between the infrared beam emitter and the infrared beam receiver, and in a case where the infrared beam is blocked, the infrared sensor from which the blocked infrared beam is emitted, among the at least one infrared sensor, generates the detection signal indicating that the target is present;
one of the infrared beam emitter and the infrared beam receiver is disposed at a first endpoint, and the other of the infrared beam emitter and the infrared beam receiver is disposed at a second endpoint; and
locations of the first endpoint and the second endpoint are set in one of following ways:
the first endpoint is located within a mounting area of the camera, and the second endpoint is fixed relative to a mounting position of the camera; and
the locations of the first endpoint and the second endpoint are set so that the mounting position of the camera is neither in an optical path of the infrared beam nor in an extension line extending from the optical path of the infrared beam.

3. The apparatus for video surveillance of claim 1, further comprising a lighting device connected to the processing device, wherein the processing device is further configured to generate a lighting enable signal upon receipt of the detection signal indicating that the target is present from the infrared sensor, and transmit the lighting enable signal to the lighting device to turn on the lighting device.

4. The apparatus for video surveillance of claim 3, wherein the detection device comprises a plurality of infrared sensors, each of the infrared sensors is configured to detect whether the target is present in the sensing area of the infrared sensor and generate a respective detection signal;
the lighting device comprises a plurality of illuminators disposed in one-to-one correspondence with the plurality of infrared sensors; and
the processing device is configured to, in a case of receiving a detection signal indicating that the target is present from the plurality of infrared sensors, generate the lighting enable signal for the infrared sensor generating the detection signal received by the processing device, so as to turn on the illuminator corresponding to the infrared sensor generating the detection signal received by the processing device.

5. A method for video surveillance, comprising:
detecting, through an infrared sensor, whether a target is present in a sensing area of the infrared sensor, and generating, in a case where it is detected that the target is present in the sensing area of the infrared sensor, a deflection instruction indicating a deflection angle, the infrared sensor being disposed at a first position within a monitored area; and
deflecting, according to the deflection instruction, a shooting direction of a camera for video surveillance towards the target by the deflection angle, the camera being disposed at a second position different from the first position and within the monitored area,
wherein the infrared sensor comprises a plurality of infrared sensors, and
the step of detecting whether a target is present in the sensing area of the infrared sensor through the infrared sensor comprises:
detecting, through each of the plurality of infrared sensors, whether the target is present in the sensing area of the infrared sensor, and generating the deflection instruction according to a combination of respective detection results of the plurality of infrared sensors, and
wherein the deflection instruction comprises a first deflection instruction and a second deflection instruction, and the step of generating the deflection instruction according to a combination of respective detection results of the plurality of infrared sensors comprises:
in a case where at least two infrared sensors of the plurality of infrared sensors sequentially detect that the target is present, generating the first deflection instruction according to a first control strategy; and in a case where at least two infrared sensors of the plurality of infrared sensors simultaneously detect that the target is present, generating the second deflection instruction according to a second control strategy different from the first control strategy.

6. The method of claim 5, wherein the plurality of infrared sensors are divided into N groups, each of the N groups comprises at least two infrared sensors, where N is a positive integer;

the step of generating the first deflection instruction according to the first control strategy comprises:

generating one first deflection instruction for an infrared sensor last detecting that the target is present in each of the N groups, wherein the deflection angle indicated by the first deflection instruction is an included angle between a current shooting direction of the camera and a shooting direction of the camera when facing the infrared sensor last detecting that the target is present; and the step of deflecting a shooting direction of the camera according to the deflection instruction comprises: every time one first deflection instruction is generated, deflecting the shooting direction of the camera towards the target by the deflection angle indicated by the first deflection instruction.

7. The method of claim 5, wherein the step of generating the second deflection instruction according to the second control strategy comprises:

selecting one infrared sensor from the at least two infrared sensors which simultaneously detect that the target is present, and generating the second deflection instruction for the selected one infrared sensor, wherein the deflection angle indicated by the second deflection instruction is an included angle between a current shooting direction of the camera and a shooting direction of the camera when facing the selected one infrared sensor.

8. The method of claim 5, wherein the step of generating the second deflection instruction according to the second control strategy comprises:

generating the second deflection instruction for the at least two infrared sensors which simultaneously detect that the target is present, wherein the deflection angle indicated by the second deflection instruction is a median of included angles between a current shooting direction of the camera and respective shooting directions of the camera when facing each of the at least two infrared sensors.

9. The method of claim 5, wherein the infrared sensor is configured to emit an infrared beam; and when the infrared beam is blocked, the infrared sensor detects that the target is present in the sensing area of the infrared sensor.

10. The method of claim 9, wherein the infrared beam is configured to have a first endpoint and a second endpoint; and the first endpoint is set within a mounting area of the camera, and the second endpoint is set to be fixed relative to a mounting position of the camera.

11. The method of claim 10, wherein when the infrared beam is blocked, the deflection instruction is generated according to an included angle 'a' between a current shooting direction of the camera and the infrared beam; and the step of deflecting a shooting direction of the camera according to the deflection instruction comprises: deflecting the current shooting direction towards the infrared beam by an angle of (a+x), where 'x' denotes delay error.

12. The method of claim 11, wherein in a case where respective infrared beams of at least two infrared sensors of the plurality of infrared sensors are blocked sequentially, a moving speed of the target is determined according to the moments when the respective infrared beams of the at least two infrared sensors are blocked, to thus determine the delay error according to the moving speed.

13. The method of claim 9, wherein the infrared beam is configured to have a first endpoint and a second endpoint; and locations of the first endpoint and the second endpoint are set so that a mounting position of the camera is neither in an optical path of the infrared beam nor in an extension line extending from the optical path.

14. The method of claim 13, wherein a reference angle 'b' relative to an initial shooting direction of the camera is set according to the locations of the first endpoint and the second endpoint;

when the infrared beam is blocked, the deflection instruction is generated according to a current shooting direction of the camera and the reference angle 'b'; and the step of deflecting the shooting direction of the camera according to the deflection instruction comprises: deflecting the shooting direction of the camera to a direction at an angle of (b+y) relative to the initial shooting direction, where 'y' denotes delay error.

15. The method of claim 14, wherein the reference angle 'b' is an included angle between a straight connection line, which connects a point of the infrared beam between the first endpoint and the second endpoint with the camera, and the initial shooting direction.

16. The method of claim 5, wherein when the infrared sensor detects that the target is present in the sensing area of the infrared sensor, a lighting device disposed in correspondence with the infrared sensor is turned on.

* * * * *